Sept. 19, 1961    G. H. KOISTINEN    3,000,132
DIPLESS MINNOW BUCKET
Filed Jan. 20, 1960

INVENTOR;
GEORGE H. KOISTINEN.

BY *Robert M. Dunning*

ATTORNEY

United States Patent Office 3,000,132
Patented Sept. 19, 1961

3,000,132
DIPLESS MINNOW BUCKET
George H. Koistinen, 209 Park Ave.,
Breckenridge, Minn.
Filed Jan. 20, 1960, Ser. No. 3,545
6 Claims. (Cl. 43—56)

This invention relates to new and useful improvements in fishing equipment and deals particularly with a bait container which is so constructed as to permit live bait to be readily removed therefrom without the use of dip nets or the inconvenience of a user having to submerge his hands into the water.

The primary feature of this invention is the provision of a bait container having a bouyant member vertically moveable within a bait receptacle, portions of, or attached to, the buoyant member being foraminous, and in the provision of a releasable means for holding the buoyant member submerged, so that upon release of the holding means the buoyant member rises to the top of the water level within the receptacle whereupon the bait may be readily removed.

Another feature of this invention is the provision of a bait receptacle in which the buoyant member is connected by arm means to a closure plate at the upper end of the receptacle so that as the buoyant member rises within the receptacle the closure plate will open simultaneously. A releasable locking clasp mounted on the closed end of the receptacle holds the closure plate in a normal closed position.

Yet another feature of this invention is the provision of a bait receptacle which may be used in combination with outside shell containers already in existence and commonly designated as "minnow buckets."

Further novel features and advantages will become apparent from the following description taken in connection with the drawings wherein.

Figure 1:
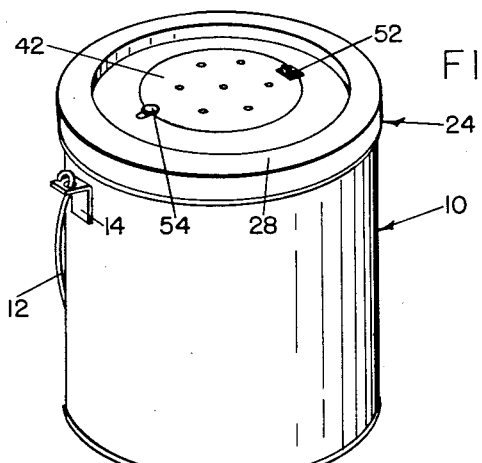
FIGURE 1 is a perspective view of the new live bait container.

The container includes an elongated cylindrical shell or outside container indicated in general by the numeral 10. This container is provided with a bale or handle 12 pivotally connected to lugs 14 which in turn are mounted in diametrically opposed relation on the outside surface of the container 10. The lower end of the container is provided with a bottom closure 16 while the upper end is open. The upper end is provided with a marginal bead or flange 18 for purposes later to be described.

The numeral 20 indicates an inner sleeve which is welded, brazed or otherwise secured at 22 to a top plate 24. This top plate is provided with a central opening 26. The raised portion or flange 28 of the top plate 24 is designed to frictionally engage the bead or flange 18 of the container 10 thereby to suspend the sleeve 20 within the container, when the device is thus assembled, water will flow and circulate freely through the container and the sleeve.

Figure 4:
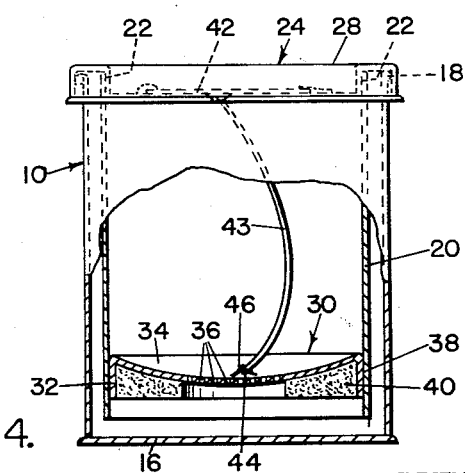
FIGURE 4 is a side elevational view of the new container, parts thereof being shown in section and certain portions shown broken away.

The interior of the sleeve 20 is provided with a buoyant member generally indicated by the numeral 30. The buoyant member 30 is preferably constructed having an outside shell 32 formed of molded plastic or the like and having a concave upper surface 34 the center portion of which is provided with a series of openings 36. The outside annular wall 32 of the buoyant member is designed to slidably engage the inner annular wall of the sleeve 20. The member 30 is made buoyant by providing the plastic shell 32 with a ring of urethane 40 or similar buoyant material which is fitted and secured into the plastic shell as is best shown in FIGURE 4.

In order that the container operate semi-automatically the buoyant member 30 is connected to a closure plate 42 by a generally U-shaped arm 43 having its lower ends 44 bent at right angles and extending into sockets 46 which are formed integrally from the plastic shell surface 34. The crossbar 48 of the U-shaped arm pivotally attaches the arm to the closure lid 42 by extending through hinge members 50 which are struck from the closure 40. The closure lid 40 is attached to the top plate 24 by a hinge 52. The lid 42 is held in a closed position by a spring loaded fastener 54 which moves towards and away from the peripheral edge of the lid while being slidably secured to the top plate 24 adjacent the lid.

Figure 3:
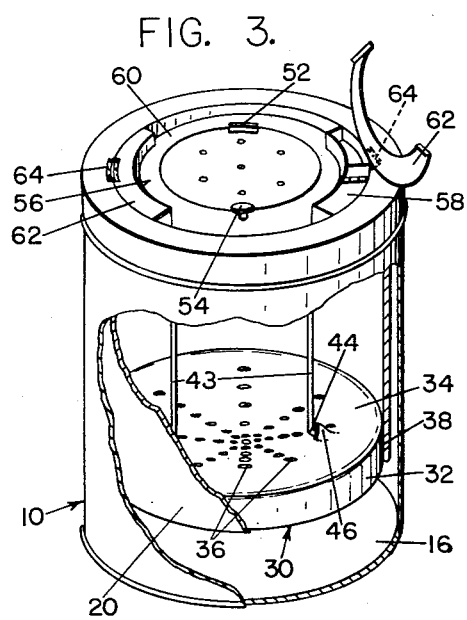
FIGURE 3 is a view similar to FIGURE 2 showing a closure plate in a closed position and showing a modified form of end plate.

Referring to FIGURE 3 specifically wherein is shown a container having a modified top plate construction, a pair of circular compartments 56 and 58 are secured to the top plate 60 by rivets or the like. Each compartment is provided with a cover 62 which is attached to the top plate 60 by hinges 64. These compartments are provided to enable fishermen to carry hooks, sinkers, and the like without having to carry a tackle box.

In operation the container is filled with water as desired and the live bait such as minnows are placed in the container upon the concave surface of the buoyant member. The lid is then closed causing the arm and buoyant member to descend within the sleeve 20. When the fisherman desires to remove the minnows from the container he urges the fastener 54 out of engagement with the lid 42 whereupon the buoyant member immediately rises to the surface of the water. The minnows are thus held out of the water where they may be readily grasped by the fisherman.

Figure 2:
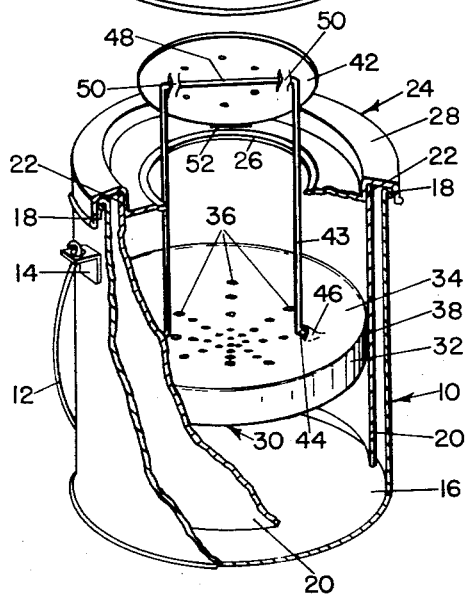
FIGURE 2 is a perspective view showing the interior construction of the new container, portions of a container, inner sleeve and top plate being shown in cross section.

The locking clasp employed relative to the embodiment shown in FIGURE 3 is similar to the one utilized in the device shown in FIGURE 2. The clasp, not shown in detail is located diametrically opposed to the hinge 52.

The device is preferably constructed of metal throughout. Any suitable means may be employed for retaining the closure plate in a closed position. Other float or buoyant means may be employed depending upon the shape of the container. The arm means employed within the receptacle connecting the closure plate to the buoyant member should be of sufficient length to insure that the buoyant member will be disposed adjacent to or close to the base of the receptacle when the closure plate is in a closed position.

In accordance with the patent statutes, I have described the principles of construction and operation of my improvement in fishing equipment and while I have endeavored to set forth the best embodiment thereof, I desire to have it understood that changes may be made within the scope of the following claims without departing from the spirit of my invention.

I claim:

1. A bait container having side walls and closed upper and lower ends, an access opening in said upper end, a buoyant member within said container adapted to loosely engage the said sides thereof, foraminous means on said buoyant member, arm means connected to said buoyant member extending upwardly through said access opening in said upper end, a closure plate engaged by said arm means, releasable locking means cooperable between said container and said closure plate for holding said plate overlying said access opening, said arm means being operable to open said closure plate upon upward movement of said arm means and said buoyant member, whereby when said container is filled with water above the level of said buoyant member and said locking means is disengaged, said buoyant member will rise and lift said closure plate.

2. In combination, a container open at its top and an inner bait receptacle having an upper closed end and a lower open end, said upper end having a peripheral flange for engagement with the upper edge of said container, an access opening in said closed upper end of said receptacle, a buoyant member within said receptacle adapted to loosely engage said side walls of said receptacle, foraminous means on said buoyant member, arm means connected to said buoyant member extending upwardly through said access opening in said upper closed end, a closure plate pivtally connected to said arm means, releasable locking means on said closed upper end of said receptacle engageable with said closure plate to hold it in a closed position, said arm means being operable to open said closure plate upon upward movement of said arm means and said buoyant member, whereby when said container is filled with water above the level of said buoyant member in said receptacle and said locking means is disengaged said buoyant member will rise and lift said closure plate.

3. The structure of claim 1 and in which said closure plate is hinged to said upper closed end of said receptacle adjacent said access opening.

4. The structure of claim 1 and in which said closure plate is pivotally connected to said arm means.

5. The structure as disclosed in claim 1 and in which said buoyant member includes a ring like formation of buoyant material having an axial opening therethrough, an annular inverted cup-like shell enclosing said buoyant material, said shell having a partially foraminous concave surface providing a surface upon which bait is deposited when said buoyant member is in a raised position above a water level within said container.

6. A bait container having a cylindrical wall and closed upper and lower ends, an access opening in said upper end, a buoyant member within said container adapted to slidably engage the inner annular surface of said cylindrical wall of said container, foraminous means affixed axially on said ring-like buoyant member, a generally U-shaped arcuate arm pivotally connected to said buoyant member and extending upwardly through said access opening of said closed end, a closure plate hingedly connected to said closed end of said container and pivotally connected to the upper extremity of said U-shaped arm, and releasable locking means on said closed end of said container engageable with said closure plate to hold it in a closed position, said U-shaped arm being operable when said container is filled with water to open said closure plate upon upward movement of said arms and said buoyant member.

References Cited in the file of this patent
UNITED STATES PATENTS

| | | |
|---|---|---|
| 1,942,756 | Howard | Jan. 9, 1934 |
| 2,531,628 | Janisch | Nov. 28, 1950 |
| 2,717,469 | Piker et al. | Sept. 13, 1955 |
| 2,870,932 | Davis | Jan. 27, 1959 |